US012746474B2

(12) United States Patent
Rogers et al.

(10) Patent No.: US 12,746,474 B2
(45) Date of Patent: Sep. 29, 2026

(54) SYSTEMS AND METHODS FOR CONSTRAINED PHYSICALLY CONTROLLED ANIMATION SELECTION AND PLAYBACK

(71) Applicant: Electronic Arts Inc., Redwood City, CA (US)

(72) Inventors: Justin D. Rogers, Orlando, FL (US); Jason A. Burnsides, Columbus, OH (US); Jacob L. Close, Munich (DE); Brandon S. Durgin, Orlando, FL (US)

(73) Assignee: Electronic Arts Inc., Redwood City, CA (US)

( * ) Notice: Subject to any disclaimer, the term of this patent is extended or adjusted under 35 U.S.C. 154(b) by 74 days.

(21) Appl. No.: 18/901,680

(22) Filed: Sep. 30, 2024

(65) Prior Publication Data

US 2026/0091316 A1 Apr. 2, 2026

(51) Int. Cl.
*A63F 13/53* (2014.01)
*A63F 13/577* (2014.01)
*A63F 13/812* (2014.01)

(52) U.S. Cl.
CPC .......... *A63F 13/577* (2014.09); *A63F 13/812* (2014.09); *A63F 2300/538* (2013.01); *A63F 2300/6607* (2013.01)

(58) Field of Classification Search
None
See application file for complete search history.

(56) References Cited

U.S. PATENT DOCUMENTS 6,195,625 B1 * 2/2001 Day ........................ G06T 19/20
703/7
10,803,660 B2 * 10/2020 Inagaki .................. G06T 13/20
10,905,956 B2 * 2/2021 Fajt ........................ A63F 13/212
2007/0097125 A1 * 5/2007 Xie ......................... G06T 13/40
345/473
2024/0161371 A1 * 5/2024 Starke ..................... A63F 13/56

* cited by examiner

*Primary Examiner* — Sunit Pandya
(74) *Attorney, Agent, or Firm* — Foley & Lardner LLP

(57) ABSTRACT

Systems and methods for constrained physically controlled animation selection and playback include a computing system configured to execute a game application configured generate a virtual game environment comprising first and second virtual character models. The game application may identify a collision event for a first frame, between the first virtual character model and the second virtual character model, where the character models are in locomotive states. The game application may determine first and second metric (s) of the character models, and apply the metrics to a model, to determine an outcome of the collision event for a second frame. The game application may identify an animation sequence having a type of animation sequence corresponding to the determined outcome, and generate the second frame according to the identified animation sequence.

20 Claims, 6 Drawing Sheets

300

302

304

SYSTEMS AND METHODS FOR CONSTRAINED PHYSICALLY CONTROLLED ANIMATION SELECTION AND PLAYBACK

FIELD OF DISCLOSURE

The present disclosure is generally related to video game applications, including but not limited to, systems and methods for constrained physically controlled animation selection and playback in video game applications.

BACKGROUND

Demand for ever increasing realism and detail in computer-implemented video games drives the growth of computer performance. Unlike computer animation and movie rendering, which can process individual scenes over time for playback at a higher frame rate, computer-implemented video games and computer-implemented simulators render complete, three-dimensional (3D) scenes of a virtual environment during runtime of the application, typically at a rate of thirty (30) frames per second or better. It can be difficult to produce animations that appear lifelike, fluid, and realistic when rendering during runtime of a game application.

SUMMARY

In one aspect, this disclosure is directed to a system, including a data store, an animation data store, and a processing circuit. The data store may include game application data. The animation data store may include a plurality of types of animation sequences relating to collision events, where each type of animation sequence corresponds to a respective outcome of the collision event. The processing circuit may include one or more processors configured to execute a game application, based at least in part on the game application data. The game application may be configured to generate a virtual game environment including a first virtual character model and a second virtual character model. The game application may be configured to identify a collision event for a first frame, between the first virtual character model and the second virtual character model, where the first virtual character model and the second virtual character model are in a locomotive state within the virtual game environment. The game application may be configured to determine one or more first metrics of the first virtual character model, and one or more second metrics of the second virtual character model, where at least one of the one or more first metrics and at least one of the one or more second metrics include (i) physics metrics relating to the locomotive state of the first virtual character model and the second virtual character model, and (ii) user inputs corresponding to user control of one of the first virtual character model or the second virtual character model. The game application may be configured to apply the one or more first metrics and the one or more second metrics to a model, to determine an outcome of the collision event for a second frame. The game application may be configured to identify, from the animation data store, an animation sequence having a type of animation sequence corresponding to the determined outcome, based on the identified animation sequence having one or more animation metrics which satisfy a match criterion corresponding to at least some of the one or more first metrics and the one or more second metrics. The game application may be configured to generate the second frame, including at least a portion of a collision between the first virtual character model and the second virtual character model, according to the identified animation sequence.

In some embodiments, the one or more first metrics include at least one of a character rating, a character pose, and character motion data. In some embodiments, the game application is further configured to determine, for the second frame, one or more updated first metrics for the first virtual character model and one or more updated second metrics for the second virtual character model. The game application may be configured to apply the one or more updated first metrics and the one or more updated second metrics to the model, to determine whether the outcome of the collision event has changed for a third frame. Responsive to the outcome of the collision event for the third frame being the same as the outcome of the collision event for the second frame, The game application may be configured to determine whether the one or more updated first metrics and the one or more updated second metrics satisfy the match criterion for the identified animation sequence; and selectively identify a different animation sequence from the animation data store, based on whether the match criterion is satisfied. The game application may be configured to generate the third frame according to the identified animation sequence or the different animation sequence. In some embodiments, the game application is configured to select the identified animation sequence responsive to the match criterion being satisfied, and the third frame is generated according to the identified animation sequence. In some embodiments, the game application is configured to, responsive to the outcome of the collision event for the third frame being a different outcome than the outcome of the collision event for the second frame, identify, from the animation data store, a different animation sequence having a different type of animation sequence corresponding to the different outcome, based on the different animation sequence having one or more animation metrics which satisfy the match criterion corresponding to at least some of the one or more updated first metrics and the one or more updated second metrics. The game application may be configured to generate the third frame according to the different animation sequence.

In some embodiments, the user inputs correspond to a direction of motion of the first virtual character model. The game application may be configured to determine a clearance of the first virtual character model in the direction of motion, based on a voxel analysis of the first virtual character model and the second virtual character model and according to the collision event. The game application may be configured to generate a path for the first virtual character model according to the clearance and the user input. In some embodiments, the second frame is generated according to the generated path and the identified animation sequence, by blending the generated path with data corresponding to the identified animation sequence. In some embodiments, the one or more first metrics includes the direction of motion.

In some embodiments, the gaming application is configured to generate a plurality of frames for rendering, including the second frame, animating the collision between the first virtual character model and the second virtual character model, according to the identified animation sequence. In some embodiments, the one or more first metrics include, for a first character corresponding to the first virtual character model, first character metrics relating to the first character, a first angular momentum, a first linear momentum, and the user inputs corresponding to a requested direction of motion of the first virtual character model. The one or more second metrics may include, for a second character corresponding to the second virtual character model, second character metrics relating to the second virtual character, a second angular momentum, and a second linear momentum.

In some embodiments, each animation sequence from the animation data store includes respective motion capture data for the animation sequence. In some embodiments, each animation sequence is tagged according to a respective type of animation sequence. The game application may be configured to identify the animation sequence by selecting, from the animation sequences in the animation data store tagged according to the type of animation sequence corresponding to the determined outcome, the identified animation sequence having the one or more animation metrics which satisfy a best fit relative to the one or more first metrics and the one or more second metrics.

In another aspect, this disclosure relates to a computer-implemented method executable by a user computing device for executing a game application. The computer-implemented method may include generating a virtual game environment including a first virtual character model and a second virtual character model. The computer-implemented method may include identifying a collision event for a first frame, between the first virtual character model and the second virtual character model, where the first virtual character model and the second virtual character model are in a locomotive state within the virtual game environment. The computer-implemented method may include determining one or more first metrics of the first virtual character model, and one or more second metrics of the second virtual character model, where at least one of the one or more first metrics and at least one of the one or more second metrics include (i) physics metrics relating to the locomotive state of the first virtual character model and the second virtual character model, and (ii) user inputs corresponding to user control of one of the first virtual character model or the second virtual character model. The computer-implemented method may include applying the one or more first metrics and the one or more second metrics to a model, to determine an outcome of the collision event for a second frame. The computer-implemented method may include identifying, from an animation data store, an animation sequence having a type of animation sequence corresponding to the determined outcome, based on the identified animation sequence having one or more animation metrics which satisfy a match criterion corresponding to at least some of the one or more first metrics and the one or more second metrics. The computer-implemented method may include generating the second frame, including at least a portion of a collision between the first virtual character model and the second virtual character model, according to the identified animation sequence.

In some embodiments, the computer-implemented method includes determining, for the second frame, one or more updated first metrics for the first virtual character model and one or more updated second metrics for the second virtual character model. The computer-implemented method may include applying the one or more updated first metrics and the one or more updated second metrics to the model, to determine whether the outcome of the collision event has changed for a third frame. The computer-implemented method may include, responsive to the outcome of the collision event for the third frame being the same as the outcome of the collision event for the second frame, determining whether the one or more updated first metrics and the one or more updated second metrics satisfy the match criterion for the identified animation sequence; and selectively identifying a different animation sequence from the animation data store, based on whether the match criterion is satisfied. The computer-implemented method may include generating the third frame according to the identified animation sequence or the different animation sequence. In some embodiments, selectively identifying the different animation sequence includes selecting the identified animation sequence responsive to the match criterion being satisfied, and wherein the third frame is rendered according to the identified animation sequence. In some embodiments, the computer-implemented method includes, responsive to the outcome of the collision event for the third frame being a different outcome than the outcome of the collision event for the second frame, identifying, from the animation data store, a different animation sequence having a different type of animation sequence corresponding to the different outcome, based on the different animation sequence having one or more animation metrics which satisfy the match criterion corresponding to at least some of the one or more updated first metrics and the one or more updated second metrics. The computer-implemented method may include generating the third frame according to the different animation sequence.

In some embodiments, the user inputs correspond to a direction of motion of the first virtual character model. The computer-implemented method may include determining a clearance of the first virtual character model in the direction of motion, based on a voxel analysis of the first virtual character model and the second virtual character model and according to the collision event. The computer-implemented method may include generating a path for the first virtual character model according to the clearance and the user input. In some embodiments, the second frame is generated according to the generated path and the identified animation sequence, by blending the generated path with data corresponding to the identified animation sequence.

In some embodiments, each animation sequence is tagged in the animation data store, according to a respective type of animation sequence. Identifying the animation sequence may include selecting, from the animation sequences in the animation data store tagged according to the type of animation sequence corresponding to the determined outcome, the identified animation sequence having the one or more animation metrics which satisfy a best fit relative to the one or more first metrics and the one or more second metrics.

In yet another aspect, this disclosure relates to a non-transitory computer readable medium storing instructions that, when executed by a computing system, causes the computing system to perform a method for rendering frames within a gaming application. The method may include generating a virtual game environment including a first virtual character model and a second virtual character model The method may include identifying a collision event for a first frame, between the first virtual character model and the second virtual character model, where the first virtual character model and the second virtual character model are in a locomotive state within the virtual game environment. The method may include determining one or more first metrics of the first virtual character model, and one or more second metrics of the second virtual character model, where at least one of the one or more first metrics and at least one of the one or more second metrics include (i) physics metrics relating to the locomotive state of the first virtual character model and the second virtual character model, and (ii) user inputs corresponding to user control of one of the first virtual character model or the second virtual character model. The method may include applying the one or more first metrics and the one or more second metrics to a model, to determine an outcome of the collision event for a second frame. The method may include identifying, from an animation data store, an animation sequence having a type of animation sequence corresponding to the determined outcome, based on the identified animation sequence having one or more animation metrics which satisfy a match criterion corresponding to at least some of the one or more first metrics and the one or more second metrics. The method may include generating the second frame, including at least a portion of a collision between the first virtual character model and the second virtual character model, according to the identified animation sequence.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DETAILED DESCRIPTION

Figure 1:
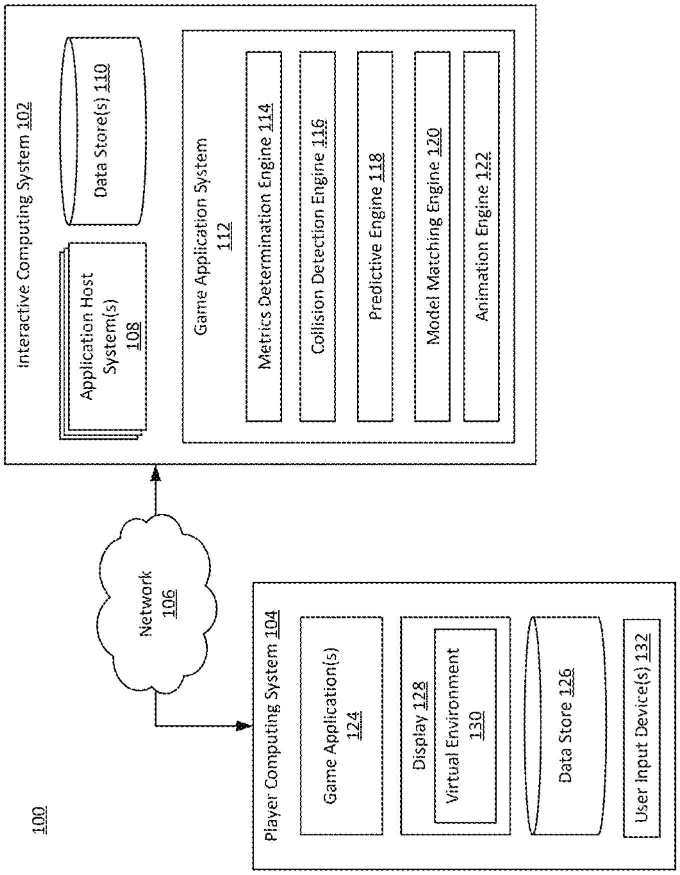
FIG. 1 is a diagram of a networked computing environment for implementing one or more embodiments of a video game application, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Overview

The systems and methods described herein relate to constrained physically controlled animation selection and playback, within the context of video game applications (or "video games"). Some video game animation systems or schemes may struggle to integrate complex player motion data with dynamic in-game actions, such as tackling, and thus lead to unrealistic or delayed animations that negatively impact the user experience. While character ratings or other metrics, such as speed or strength, may be represented statically, the translation of such metrics into fluid, real-time animations may lack accuracy and precision. For example, within the context of tackling in-game actions, tackling animation may be prone to visual and mechanical inconsistencies, as such animations may not account for subtle variations in player motion data, environmental conditions, and other physics-based mechanics (e.g., character and opponent positioning, angular and linear momentum, and so forth). As a result, some tackling animation may result in predicable results, inconsistencies with real-life scenarios, and other deficiencies that diminish gameplay realism and user enjoyment.

According to the systems and methods described herein, a game application (e.g., corresponding to a video game) may generate a virtual game environment including various virtual character models (e.g., a player virtual character model and an opponent virtual character model, also referred to herein as a "player model" and an "opponent model"). The game application may identify a collision event (e.g., an impending tackle, as an example) for a first frame, between the player model and the opponent model, where the respective models are in a locomotive state within the virtual game environment. The game application may determine various metrics of the player and opponent models, some of which may correspond to the locomotive state of the player and opponent models. For example, the metric(s) may include character pose or position within the virtual environment, angular and/or linear momentum, any user inputs relating to direction of motion or changes to the angular/linear momentum, and/or player/character ratings. The game application may apply the metrics to a model (e.g., a prediction model), to determine an outcome of the collision event for a second frame. For example, the outcome may be determined from a plurality of different types of outcomes, such as a fall outcome, a stumble outcome, a get-up outcome, a missed tackle outcome, and evasion outcome, and so forth. The outcome may thus be determined (e.g., on a frame-by-frame basis) according to the metric(s) for the player and opponent models leading up to the tackle, and as the tackle progresses. The game application may identify, from an animation data store, an animation sequence having a type of animation sequence corresponding to the determined outcome. The game application may identify the animation sequence using, for example, a pose trajectory matching model, an animation matching model, or more generally, a matching model. The matching model may select the animation sequence according to a match criterion applied to at least some of the metrics (e.g., of the player and opponent models) and corresponding metrics for the animation sequence. The game application may be configured to render the second frame, including at least a portion of a collision between the first virtual character model and the second virtual character model, according to the identified animation sequence.

The systems and methods described herein provide several technical solutions to various technical problems encountered in some video game animation systems, particularly in relation to player motion data and collision events, such as tackling.

For example, some video game animation systems may have a limited set of animations, which may result in predictability and repetition of collision animations, particularly in high-contact scenarios, such as tackles. Over time, players may become familiar with the limited set of animations, which reduces the overall engagement and realism of the video game. Additionally, where the same collision outcomes are triggered repeatedly based on predetermined sequences, regardless of the specific dynamics of the interaction, the video game may become more predictable. The systems and methods described herein may solve this problem by introducing a dynamic approach to collision event detection, outcome prediction, and animation sequence selection. For example, by leveraging real-time metrics such as player ratings, physical attributes, and momentum data, the systems and methods described herein may select animation sequences, from a wide variety of animation sequences stored in a data store, according to a predicted outcome. The animation sequences may be tailored to different collision events, and different types of outcomes, based on the specific conditions of the interaction and/or metrics. The systems and methods described herein may thus produce a greater variety of animations, reducing repetition and making each collision feel more unique and unpredictable, thereby enhancing the realism and engagement of the video game.

As another example, some video game animation systems may struggle with creating smooth transitions between animation frames, particularly during high-speed collisions between virtual character models. This may result in choppy or abrupt animations where the visual flow of a collision event feels unnatural, leading to a disjointed user experience. Additionally, some video game animation systems may select an animation scheme/sequence statically, thus not accounting for dynamic changes in the virtual environment conditions. The systems and methods described herein may solve these technical problems by determining real-time metrics at each frame of the animation sequence. In calculating real-time metrics on a frame-by-frame basis, the systems and methods described herein may dynamically adjust the animation sequence based on updated metrics, thereby ensuring that transitions between frames are smooth and natural. Additionally, the systems and methods described herein may leverage, utilize, or otherwise incorporate an animation matching model (e.g., a pose-trajectory-matching (PTM) model) which selects animation sequences corresponding to a determined/predicted outcome, which most closes matches with the real-time virtual environment conditions, thus improving the fluidity of the animations during collisions.

Overall, the systems and methods provide technical solutions to enhance the realism, fluidity, and responsiveness of collision animations in video games, particularly for complex scenarios like tackling, by leveraging character metrics, dynamic modeling, and a robust animation data store.

Overview of User Interface Navigation System and Operating Environment

FIG. 1 is a diagram of a networked computing environment 100 for implementing one or more embodiments of a navigational system for video game play configuration, according to an example implementation of the present disclosure. The network computing environment 100 is shown to include an interactive computing system 102 communicably coupled to a player computing system 104 via a network 106. While FIG. 1 illustrates one interactive computing system 102 and one player computing system 104, it is noted that the networked computing environment 100 may include multiple instances of the interactive computing system 102 and/or multiple player computing systems 104. The interactive computing system 102 may be or include a computing system or environment which hosts, provisions, provides, manages, or otherwise supports one or more applications. The interactive computing system 102 may include one or more application host systems 108, a data store 110, and a game application system 112 including a plurality of engines 116-122 for providing a virtual environment 130 relating to an application 124 (e.g., a game application 124) supported by the application host system(s) 108.

The player computing system 104 may include, execute, run, or otherwise provide one or more game applications 124. The player computing system 104 may be configured to communicate (e.g., via the network 106) with the application host system(s) 108 to download/upload or otherwise exchange information relating to the game application(s) 124 provided by the player computing system 104. Such information may be stored or otherwise maintained by a data store 126 of the player computing system 104, uploaded for storage at the data store 110 at the interactive computing system 102, etc. The player computing system 104 may include or be communicably coupled with a display 128 configured to render, display, or otherwise provide the virtual environment 130. The display 128 may be or include any type or form of display, including a light emitting diode (LED) display, an organic-LED (OLED) display, liquid crystal display (LCD), plasma display, or any other type or form of display, which may be integrated into the player computing system 104 or a standalone display (such as a monitor or television) communicably coupled to the player computing system 104. The player computing system 104 may include one or more user input device(s) 132 for receiving user interactions for navigating/selecting/interacting with the virtual environment 130. The user input device (s) 132 may include, for example, a handheld controller, touchpad, a keyboard, a mouse, a joystick, stylus, gesture recognition sensor, or any other type/form of input device.

The network 106 may be or include any type or form of wired or wireless communication network to facilitate communication between two or more endpoints. For example, the network 106 may include a cellular or internet-based network. Additionally, the player computing system 104 and/or interactive computing system 102 may use a corresponding local network. For example, the player computing system 104 may be communicably coupled to a local area network (such as a wireless local area network, e.g., WI-FI). In this example, communications sent from the player computing system 104 (and conversely, received by the player computing system 104) may be routed via the local area network.

A. Interactive Computing System

The interactive computing system 102 may include application host systems 108, a data store 110, and a game application system 112. These systems may cooperate or otherwise communicate with one another, as part of providing various portions of the virtual environment 130 described herein. For example, the game application system 112 may obtain data associated with the game application 124 from the application host system(s) 108, and retrieve data corresponding to virtual character models, character ratings, etc. from the data store 110. Additionally, the game application system 112 may receive user inputs (e.g., from the user input device 132) for interacting within the virtual environment 130 of the game application 124. In some embodiments, the application host system(s) 108 may communicate with the data store 110 to execute/provision/host the game application 124. In some embodiments, the interactive computing system 102 may be associated with a network-based service, which may be operated or managed by a game publisher, game developer, platform provider, or other host entity.

1. Application Host Systems

The application host system(s) 108 may be configured to execute a portion of the game application 124 operating on the player computing system 104, a host application or resource, or any other application or service of the interactive computing system 102. In various embodiments, the interactive computing system 102 may be configured to facilitate multiple players or player computing systems 104 accessing a portion (or instance) of the game application 124. In some embodiments, the portion of the game application 124 executed by application host system(s) 108 may create a persistent virtual environment. The persistent virtual environment may facilitate interaction amongst players in a synchronous and/or asynchronous manner. In some cases, multiple instances of the persistent virtual environment may be established, hosted, or otherwise managed by the interactive computing system 102 (e.g., through execution by the application host system(s) 108). For example, the application host system(s) 108 and/or interactive computing system 102 may be configured to assign a set of players (or player computing systems 104) to one instance of the persistent virtual environment for access, while assigning another set of players (or player computing systems 104) to another instance of the persistent virtual environment for access.

In some embodiments, the application host system(s) 108 may execute a hosting system for executing various aspects of a game environment. For example, in one embodiment, the game application 124 may be a competitive game, such as a sports game, and the application host system 108 may provide a dedicated hosting service for hosting multiplayer game instances. As another example, the application host system 108 may be configured to facilitate the creation of game instances hosted by player computing systems 104. In some embodiments, the application host system(s) 108 may provide a lobby or other environment for players to virtually interact with one another.

2. Data Store of Interactive Computing System

The interactive computing system 102 may include one or more data stores 110. The data store 110 may be configured to store data acquired by other systems, such as, for example, telemetry data, video data, game or user interface state information, user data, character data or metrics, or the like. In some embodiments, the data store 110 may store user profile data associated with a video game publisher, a game platform provider or other service. In such an example, the user profile data may be deployed, provisioned, or otherwise provided by the interactive computing system 102 to the player computing system 104 (e.g., at log-in), which facilitates user maintained preferences, progress, customization information, and/or other data across a plurality of different video games and player computing systems 104. The data store 110 may be distributed across multiple computing systems (such as multiple interactive computing systems 102). In some embodiments, the data store 110 may be network-based storage system where data may be stored in different locations.

The data store 110 may be configured to store, include, maintain, or otherwise incorporate character metrics. The character metrics may be or include metrics relating to each of the characters which may be included/incorporated into the virtual environment 130. For example, where the game application 124 relates to a sports game (e.g., a football game), the character metrics may include character metrics for each available and/or configured (e.g., user-created and/or user-configured) player/character in the sports game. The character metrics may be or include overall player ratings, as well as metrics relating to specific character tasks. Continuing the above example, the character metrics for a character relating to an offensive football player may include metrics relating to an overall player rating, as well as metrics relating to individual tasks (e.g., ball catching, run blocking, direction shifting, breaking tackles, balance, speed, etc.). In various embodiments, the character metrics may be updated periodically. For example, the application host systems 108 may be configured to push updates of the character metrics stored in the data store(s) 110 from time to time (e.g., during the season), such that the character metrics are aligned with/relate to the real-life metrics related to the player corresponding to the virtual character. The data store 110 may be configured to include virtual character models relating to each of the virtual characters. The virtual character models may be or include an animated or renderable version of the virtual characters which are playable in the virtual environment 130.

Figure 2:
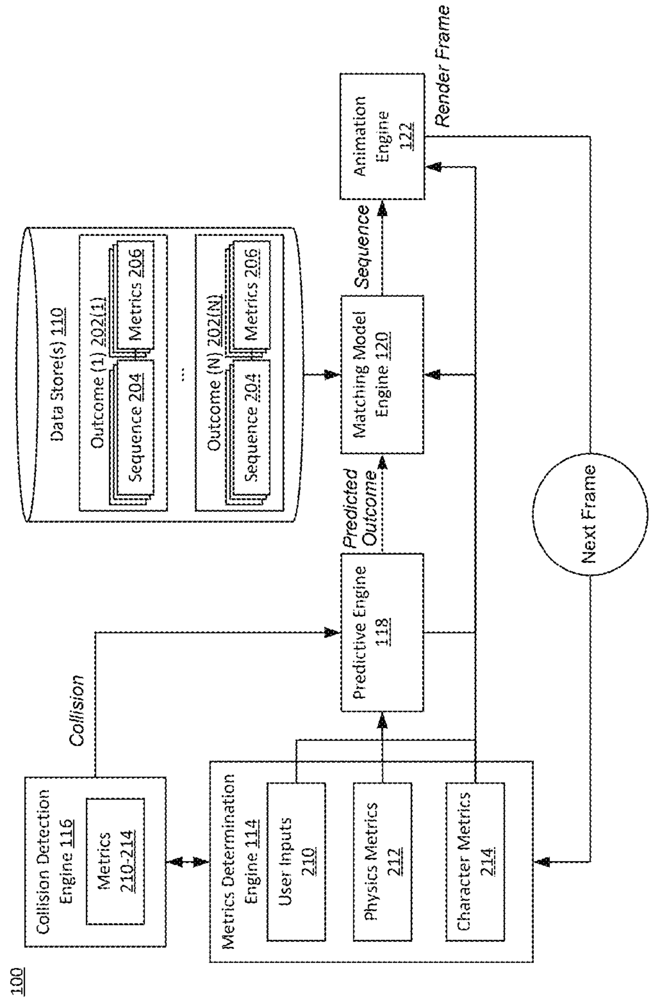
FIG. 2 is a diagram showing a process flow of constrained physically controlled animation selection and playback, according to an example implementation of the present disclosure.

Referring briefly to FIG. 2, the data stores 110 may be configured to include, incorporate, or otherwise maintain data relating to animation sequences 204 and corresponding metrics 206 relating to a plurality of outcomes 202(1)-(N) (generally referred to as "outcomes"). The outcomes 202 may be, include, or correspond to an outcome of a collision event between two (or more) virtual character models within the virtual environment (among other possible animation sequences 204). The outcomes 202 may include, for example and within the context of a collision event for a football game application 124, a stumble outcome, a fall outcome, a broken tackle outcome, and so forth. Each of the animation sequences 204 may be tagged or labeled with the corresponding outcome 202 (e.g., within the data store 110). In other words, a subset of animation sequences 204 relating to stumble outcomes may be tagged or otherwise identified within the data store 110 as being an animation sequence 204 of a stumble outcome. Similarly, a subset of animation sequences 204 relating to fall outcomes and/or broken tackle outcomes may be tagged or otherwise identified as such within the data store 110.

Each animation sequence 204 may be or include motion capture data of the character/player. The motion capture data may be or include a digital recording of human or object movement within an environment, that may be used to create or otherwise render life-like animations. In some embodiments, the motion capture data may be recorded by capturing or tracking motion of a subject in real-time, and converting the tracked motion into digital data that may be applied to virtual character models for animating the tracked motion. In some embodiments, the subject of the motion capture data may include or have markers positioned on the subject's body (e.g., joints and limbs), which are tracked and converted to a sequence of three-dimensional (3D) coordinates corresponding to the location of each marker over time. The 3D coordinates may be stored as 3D coordinate points (x, y, z) for each marker, as a time series that reflects the subject's movement (e.g., a skeletal animation). Where the animation sequence 204 involves a collision event between two (or more) characters, the motion capture data may be stored in association with one another, to reflect an animation sequence 204 of the collision event.

Each animation sequence 204 may be stored in association with various metrics 206. The metrics 206 may be or include metrics similar to those metrics 210-214 described in greater detail below. The metrics 206 may include, for example, physics metrics relating to movement of the characters/subjects in connection with the animation sequence 204, such as angular/linear momentum, velocity, character mass, and so forth. As described in greater detail below, the game application system 112 may be configured to, responsive to identifying a collision event between two or more virtual character models within the virtual environment 130, determine a predicted outcome (e.g., based on real-time metrics 210-214 within the virtual environment 130), and select an animation sequence 204 from the data store 110 tagged according to the predicted outcome, and having metrics 206 which satisfy a match criterion corresponding to the real-time metrics 210-214. The game application system 112 may be configured to use the selected animation sequence 204 to animate a next frame (or frames), to provide animations which are contextually tailored to the virtual environment 130, and thereby providing more life-like animation sequences.

In some embodiments, the animation sequences 204 and corresponding metrics 206 may be used across multiple game applications 124. For example, where a given game application 124 relates to a type of competitive sports game (such as a football game), the animation sequences 204 and corresponding metrics 206 may be used for different iterations of the type of competitive sports game (e.g., collegiate sports game application 124, professional sports game application 124, etc.).

Game Application System

Referring to FIG. 1 and FIG. 2, the game application system 112 may be configured to provide information, data, and the like for generating, rendering, displaying, updating, animating, or otherwise providing the virtual environment 130. Specifically, FIG. 2 is a diagram showing a process flow of constrained physically controlled animation selection and playback, according to an example implementation of the present disclosure.

The virtual environment 130 may include various virtual character models, some of which may be user-controlled (e.g., player-controlled virtual character models) and others of which may be non-player characters (e.g., computer or game application 124 controlled virtual character models). The game application system 112 may be configured to collect various real-time and character-related metrics 210-214 during game play, and use those for selecting animation sequences 204 which are contextually-related to the virtual environment 130.

The game application system 112 may include one or more engines 114-122. The engines 114-122 may be or include any device, component, element, or hardware designed or configured to execute or otherwise perform various functions relating to the virtual environment 130 described herein. For example, the game application system 112 may include a metrics determination engine 114, a collision detection engine 116, a predictive engine 118, a model matching engine 120, and an animation engine 122. While these engines 114-122 are shown and described herein, it is noted that fewer and/or alternative engines may be incorporated into the game application system 112. For example, one or more of the engines 114-122 may be divided into multiple engines. Additionally or alternatively, two or more of the engines 114-122 may be combined into a single engine.

a. Metrics Determination Engine

The game application system 112 may include a metrics determination engine 114. The metrics determination engine 114 may configured to determine, identify, receive, or otherwise manage metrics 210-214 relating to each of the virtual character models within the virtual environment 130. The metrics determination engine 114 may be configured to identify metrics relating to real-time playing conditions within the virtual environment, including user inputs 210 relating to direction of movement and requested speed of virtual character models, and physics metrics 212 relating to physical traits, characteristics, and/or other quantifiable physical metrics relating to the movement/motion of the virtual character models in respective locomotive states. The metrics determination engine 114 may be configured to determine character metrics 214 relating to each of the virtual character models, which may be similar to those described above which may be included/incorporated into/managed at the data store(s) 110. Each of these metrics 210-214 are described in greater detail below.

In some embodiments, the metrics determination engine 114 may be configured to determine user inputs 210. User inputs 210 may be or include data corresponding to interactions provided by an end-user relating to a particular virtual character model in the virtual environment 130. In some embodiments, the user may provide the interactions to the user input device 132, for controlling the virtual character model in the virtual environment 130. The user input device 132 may communicate one or more signals (e.g., via a local connection) to the game application 104, where the signal(s) correspond to the interactions provided to the user input device 132. The player computing system 104 may be configured to communicate, e.g., via the network 106, the signal(s) (or other signals relating to the signals) to the interactive computing system 102 for receipt by the metrics determination engine 114. In some embodiments, where multiple players or users are providing interactions for controlling respective virtual character models, the metrics determination engine 114 may be configured to receive multiple data streams corresponding to each of the user inputs. Similarly, where certain virtual character models are non-player characters (NPCs), the gaming application 124 (or application host system(s) 108) may be configured to determine movement/velocity inputs according to executable game logic, and communicate inputs relating to the movement/direction/velocity/etc. to the game application system 112 for receipt by the metrics determination engine 114.

The metrics determination engine 114 may be configured to receive or otherwise determine one or more physics metrics 212 relating to the virtual character models. The physics metrics may be or include metrics relating to movement/motion/etc. of the virtual character models within the virtual environment 130. For example, each of the virtual character models may be in a locomotive state, which includes involves movement in a direction. The metrics determination engine 114 may be configured to determine the physics metrics 212 relating to the locomotive state of the virtual character models. The physics metrics 212 may include each virtual character model's mass, position, velocity, direction of movement, and/or various derived physics metrics based on those physics metrics 212. Various examples of physics metrics 212 are described in greater detail below.

The physics metrics 212 may include a mass corresponding to the virtual character model. The metrics determination engine 114 may be configured to determine the mass of the character corresponding to the virtual character model based on information stored in the data stores 110 (e.g., similar to the player ratings and other character metrics 214 described below). The physics metrics 212 may include a position, direction of movement, and velocity. The position may be or include coordinates within the virtual environment 130 in which the virtual character model is located at a given time instance. The direction of movement may be or include an angle or trajectory of movement from the position of the virtual character (e.g., at the given time instance) to a subsequent position. For example, the direction of movement may correspond to the user input(s) for controlling the trajectory/direction of movement for a player-controlled virtual character model. As another example, the direction of movement may correspond to computer provided input(s) for controlling the trajectory/direction of movement for an NPC virtual character model. The velocity may be an instantaneous or time average velocity of movement over a series of time instances (e.g., from the current position at the given time instance, or from a previous position at a previous time instance, to a subsequent time instance). The velocity may be determined based on user inputs (e.g., to accelerate, run at full speed, etc.) and/or based on character metrics 214 (e.g., maximum acceleration, maximum velocity, etc.).

The metrics determination engine 114 may be configured to determine a movement vector for each of the virtual character models within the virtual environment. The movement vector may include an origin corresponding to the position of the virtual character model, an angle corresponding to the direction of movement of the virtual character model, and a magnitude corresponding to the velocity of the virtual character model. The metrics determination engine 114 may be configured to use at least some of these physics metrics 212 for determining additional (or derived) physics metrics 212.

The metrics determination engine 114 may be configured to determine derived physics metrics 212, including but not limited to a linear momentum, an angular momentum, a torque, a collision angle, and/or a relative velocity. The metrics determination engine 114 may be configured to determine linear momentum by calculating a product of the mass of a given virtual character model and the corresponding velocity. The metrics determination engine 114 may be configured to determine the angular momentum by computing a rotation of a virtual character model (e.g., body and/or limbs of the virtual character model), based on the velocity and a radius of rotation. The metrics determination engine 114 may be configured to determine the torque based on or according to forces which cause rotational motion around an axis (e.g., the body of the virtual character model and/or limbs of the virtual character model). The metrics determination engine 114 may be configured to determine the collision angle by calculating the angle (e.g., resultant angle) at which two or more virtual character models are approaching one another (e.g., using the respective movement vectors). The metrics determination engine 114 may be configured to determine relative velocity, similar to the collision angle, based on a comparison of the velocity and direction of two or more virtual character models as indicated by the respective movement vectors.

The metrics determination engine 114 may be configured to determine character metrics 214 relating to each of the virtual character models which are in the virtual environment 130. The metrics determination engine 114 may be configured to determine the character metrics 214 by retrieving the character metrics 214 from the data store(s) 110. For example, the metrics determination engine 114 may be configured to request and receive, from the data store(s) 110, the character metrics 214 for virtual character models corresponding to each of the playable characters within the virtual environment 130. The character metrics 214 may include character traits (e.g., mass, maximum speed, maximum acceleration, stamina, balance, etc.), overall player ratings, as well as metrics or ratings relating to individual tasks performable within the virtual environment 130 (e.g., ball catching, run blocking, breaking tackles, etc.).

In some embodiments, the metrics 210-214 may include metrics determined or otherwise derived based on various combinations of the aforementioned metrics. For example, the metrics determination engine 114 may be configured to determine virtual character model physicality (generally referred to as physicality metrics), virtual character model dynamics (generally referred to as dynamics metrics), virtual character model impact influence (generally referred to as impact influence metrics), and/or virtual character model impact reaction (generally referred to as impact reaction metrics). The metrics determination engine 114 may be configured to determine these physics metrics based on or according to the real-time conditions of the virtual environment and/or virtual character models within the virtual environment 130.

The physicality metrics may include posing metrics and dynamic metrics. The posing metrics may include 3D coordinates of, e.g., leg position, feet position, rotation of feet to spine, feet position to torso, torso tilt, torso rotational velocity, torso linear velocity, and so forth. Dynamic metrics may include or relate to the posing metrics and other factors. For example, the dynamic metrics may include whether the virtual character model is in motion (e.g., based on the torso rotation and/or linear velocities), whether the virtual character model is down (e.g., whether a particular combination of joints or limbs are considered down, whether the torso is down), whether the virtual character model is falling (e.g., the virtual character model is in motion and linear momentum is downward), whether the virtual character model is aerial (e.g., the virtual character model's feet have not been planted for a predetermined duration and the virtual character model is not down), and/or whether the virtual character model is covered (e.g., if the virtual character model is down and there are contact forces on the virtual character model's body and/or limbs).

Figure 3:
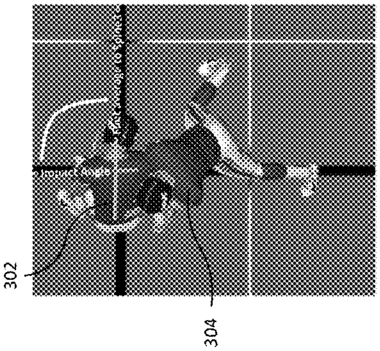
FIG. 3 is an animation frame of an impact and leverage of two virtual character models, according to an example implementation of the present disclosure.

The dynamics metrics may include recoverability metrics and leverage metrics. The recoverability metrics may include or indicate a likelihood of a virtual character model to reposition their feet beneath their center of mass and/or otherwise influence their center of mass. The recoverability metrics may include or correspond to foot metrics (e.g., their predicted position, resilience based on character metrics 214, and/or current position, as compared to joints of the virtual character model). The leverage metrics may include or correspond to muscular strength of a virtual character during the moment of impact (e.g., based on character metrics 214). The leverage metrics may correspond to the positional leverage of each leg of the virtual character model in addition to the torso situation rating described below. As shown in FIG. 3, which shows an animation frame 300 of an impact and leverage of two virtual character models 302, 304, the leverage metrics may influence the ability of one virtual character model 302 to break a tackle based on the impact angle of another virtual character model 304.

The balance metrics may include various derived metrics based on character metrics 214 and corresponding physics metrics 212. For example, the balance metrics may include mass movement direction (e.g., center of mass movement direction of the virtual character model), balance position radius (e.g., area of effect around the center of mass which may be used for determining recoverability), line of action (e.g., line of action from the center of mass through the average position of the legs of the virtual character model), feet to hips rating (e.g., feet position relative to the virtual character model's hips, where the rating increases the more the virtual character model is upright), foot leading angle tolerance (e.g., the maximum allowed difference between the foot leading the center of mass), axial tilt of hip forward rating (e.g., how off-center the virtual character model is relative to the ground), axial tilt of hip roll rating (e.g., roll of torso relative to tilt of hip forward rating), and/or torso posture rating (e.g., angular distance between hips to spine and hips to hips forward facing angle of the virtual character model).

The impact influence metrics may include registered force metrics, impact influence metrics, and motion path metrics. The registered force metrics may include an angular difference between the contact force angle and virtual character model movement direction, along with a corresponding relative intensity (e.g., based on magnitude of the movement vectors). The impact influence metrics may include or correspond to a comparison of the leverage metrics, to the linear momentum direction and angle of approach of the incoming virtual character model. The motion path metrics may include a correspondence between the movement direction and the impact angle (e.g., the greater the difference between the magnitude of impact and resistance, the more the movement direction is shifted towards the impact angle). Similarly, the motion path metrics may include a motion path speed, based on the character metrics relating to recoverability (e.g., if the recoverability is low, the linear momentum may be used for the motion path speed).

The impact reaction metrics may relate to some of the aforementioned metrics used for determining or predicting the outcome of a given collision event, and corresponding metrics which are activated/used/applied post-collision. For example, such metrics may include foot velocity, motion path, root motion, arm and hip velocity, and so forth, some of which may be weighted based on character metrics and changing dynamic conditions of the collision event.

As described in greater detail below, at least some of the metrics 210-214 determined by the metrics determination engine 114 may be used to determine, detect, or otherwise identify a collision event between two or more virtual character models for a given frame. Responsive to detecting the collision event, the metrics 210-214 may be used to determine a predicted outcome, and for selecting an animation sequence 204 from the data stores 110 for animating one or more subsequent frames relating to the collision event. In this regard, the collision event may be evaluated and re-evaluated on a frame-by-frame basis, based on updated metrics, to update the predicted outcome and/or to select updated animation sequences 204 which most closely match the real-time metrics of the virtual environment 130 and virtual character models therein.

b. Collision Detection Engine

The game application system 112 may include a collision detection engine 116. The collision detection engine 116 may be configured to detect, determine, or otherwise identify a collision event between two or move virtual character models within the virtual environment 130. In some embodiments, the collision detection engine 116 may be configured to identify the collision event(s) based on the metrics 210-214 determined by the metrics determination engine 114. The collision detection engine 116 may be configured to identify the collision event(s) on a frame-by-frame or a tick-by-tick basis, based on the metrics 210-214 determined by the metrics determination engine 114 for each virtual character model. In some embodiments, the collision detection engine 116 may be configured to identify the collision event(s) based on the movement vectors for each of the virtual character models. For example, the collision detection engine 116 may be configured to analyze the movement vectors of two or more virtual character models, to determine whether their respective paths and/or trajectories are converging. For example, the collision detection engine 116 may be configured to identify a collision event based on the distance between two or more virtual character models (e.g., using the respective origins of the movement vectors), and their respective trajectories (e.g., using the angle and magnitude of the movement vectors), to determine whether the predicted trajectories are to intersect within a certain time frame (e.g., within a number of ticks, frames, etc.). Where the predicted trajectories are to intersect within a certain time frame, the collision detection engine 116 may be configured to identify the collision event. In this regard, the collision detection engine 116 may be configured to assess and reassess the movement vectors on a frame-by-frame (or tick-by-tick) basis, to update and/or identify new collisions based on the real-time conditions of the virtual environment 130.

Where the collision detection engine 116 identifies a collision between two or more virtual character models, the collision detection engine 116 may be configured to set a flag or indicator identifying the collision event. Where the movement vectors change for a subsequent frame or tick (e.g., based on user inputs), the collision detection engine 116 may be configured to reassess whether the collision event is predicted to occur, and update any flags/indicators to reflect the reassessment (as well as identify any newly predicted collision events based on the updated conditions of the virtual environment 130).

c. Predictive Engine

The game application system 112 may include a predictive engine 118. The predictive engine 118 may be configured to determine, identify, select, or otherwise predict an outcome of collision events (e.g., identified by the collision detection engine 116). The predictive engine 118 may be configured to determine/predict the outcome of the collision event, based on at least some of the metrics determined by the metrics determination engine 114. The predictive engine 118 may be configured to determine the predicted outcome of the collision event, by applying at least some of the metrics of the respective virtual character models involved in the collision event to a predictive model (e.g., a predictive physics-based model).

The predictive engine 118 may be configured to use physics metrics 212, character metrics 214, and/or user inputs 210 determined by the metrics determination engine 114, to compute the predicted outcome of a collision event between two or more virtual character models within the virtual environment 130. Once a collision event is identified by the collision detection engine 116, the predictive engine 118 may be configured to apply at least some of the metrics 210-214 to the predictive model, to calculate, identify, determine, or otherwise predict the result of the collision. For example, using the physics metrics 212, the predictive engine 118 may be configured to use the linear momentum and angular momentum of each virtual character model, to determine or predict the forces each virtual character model exerts (e.g., on one another) (e.g., relative forces) at the point of collision. The predictive engine 118 may be configured to compute the relative forces based on the respective trajectories and velocities of the virtual character models (e.g., using their respective movement vectors), and calculating the combined momentum at the moment of impact.

The predictive engine 118 may be configured to use the character metrics 214 from the metrics determination engine 114, to modify, adjust, weight, or otherwise apply a factor to the combined momentum and other physics-based characteristics relating to the collision event, according to individual character attributes. For example, a virtual character model with higher strength may be able to resist a greater amount of force before being knocked down, while a virtual character model with higher balance may be more likely to remain upright after a glancing collision. The predictive engine 118 may be configured to use the character metrics 214 as input modifiers, thereby weighting the predicted outcome according to the individual character attributes of each virtual character model.

Additionally, the predictive engine 118 may be configured to use the movement direction and velocity (or changes in velocity), according to user inputs 210, for determining the predicted outcome of the collision. In some embodiments, the predictive engine 118 may be configured to determine the predicted outcome based on changes to a respective movement vector of the corresponding virtual character model controlled by an end-user. For example, if a user attempts to change direction just before a collision, the metrics determination engine 114 may be configured to update the movement vector for the virtual character model being controlled in real-time (or near real-time) to reflect the change in velocity and trajectory. Correspondingly, the predictive engine 118 may be configured to update the collision dynamics based on the updated movement vector, to refine the predicted outcome based on or according to the user inputs 210. Similarly, if a user input 210 causes the virtual character model to accelerate or decelerate, the predictive engine 118 may be configured to update the predicted outcome of the collision based on the corresponding changes to the linear and/or angular momentum of the virtual character model.

In some embodiments, the predictive engine 118 may be configured to incorporate or otherwise leverage voxel analysis to refine the prediction of collision outcomes based on user inputs 210. Specifically, when a user provides inputs corresponding to a change in direction or speed for a given virtual character model, the predictive engine 118 may be configured to analyze the clearance of the virtual character model in the new direction. The predictive engine 118 may be configured to generate a voxel grid in the 3D space surrounding the virtual character model being controlled, where each 3D unit represents a voxel in the voxel grid, and the 3D space indicates occupied space by any virtual character models in the virtual environment. When the user input 210 corresponds to a change in the direction of motion, the predictive engine 118 may be configured to evaluate the voxel grid, to determine whether there is sufficient clearance for the virtual character model to follow the requested path. The predictive engine 118 may be configured to apply the requested path to the voxel grid, to determine whether any voxels along the newly requested path are occupied or obstructed by, e.g., any second virtual character models, indicating whether the first virtual character model has adequate clearance to proceed.

Based on the voxel analysis, the predictive engine 118 may be configured to generate a new path for the first virtual character model, aligning with the user input and the available clearance. If the voxel analysis indicates sufficient space for the character to move in the desired direction, the predictive engine 118 and/or the metrics determination engine 114 may be configured to update the movement vector for the virtual character model, accordingly. The metrics determination engine 114 may be configured to recalculate the associated physics metrics 212, such as velocity and momentum, and the predictive engine 118 may be configured to determine the predicted outcome based on the updated movement vector and recomputed physics metrics 212 for the first virtual character model. Conversely, if the voxel analysis identifies obstacles or insufficient clearance, the predictive engine 118 may be configured to alter the path or adjust the predicted outcome, potentially preventing the character from evading the collision.

In this regard, the predictive engine 118 may be configured to perform iterative frame-by-frame calculations/predictions, based on the physics metrics of each of the virtual character models within the virtual environment 130. At each frame or tick, the predictive engine 118 may be configured to re-apply the physics metrics 212 (momentum, torque, etc.) and character metrics 214 to simulate how the virtual character models interact dynamically over time. If the forces applied by one character exceed the resistance provided by the other (as determined by the relative momenta and character strength), the predictive engine 118 may be configured to predict an outcome, such as a fall or stumble. If the forces are not sufficient to overcome resistance, the prediction may indicate that the character resists the collision and maintains balance.

d. Model Matching Engine

The game application system 112 may include a model matching engine 120. The model matching engine 120 may be configured to determine, identify, or otherwise select an animation sequence 204 from the data store(s) 110. As described above, the data store(s) 110 may be configured to maintain, include, or otherwise store various animation sequences 204 along with corresponding metrics 206, where each animation sequence is tagged or labeled according to an outcome 202 representing or indicating the corresponding animated result of a collision event, such as a fall, stumble, or successful tackle. The model matching engine 120 may be configured to receive or otherwise retrieve an animation sequence 204 from the data store 110 based on the predicted outcome of the collision event determined by the predictive engine 118. Specifically, and as described in greater detail below, the model matching engine 120 may be configured to identify the animation sequence 204 that has been tagged with the predicted outcome 202 identified by the predictive engine 118, and has corresponding metrics 206 that satisfy a match criteria or criterion with respect to the metrics 210-214 of the virtual character models involved in the collision event.

In some embodiments, the model matching engine 120 may be configured to compare the metrics 206 of the stored animation sequences 204, to at least some of the metrics 210-214 determined by the metrics determination engine 114. As described above, each animation sequence 204 is associated with metrics 206 that describe, identify, or otherwise relate to the physical properties of the animation (e.g., the 3D coordinates relating to the skeletal animation), such as velocity, force, or direction of movement of virtual character models involved in the corresponding collision event. In some embodiments, the model matching engine 120 may be configured to perform or otherwise execute a best-fit matching process, where the model matching engine 120 selects the animation sequence 204 having metrics 206 most closely align (e.g., satisfy a match criterion or criteria) with the metrics 210-214 of the virtual character models. For example, where the metrics determination engine 114 determines that the virtual character models are moving at a certain velocity and exerting a particular force during the collision event, and the predictive engine 118 determines that the predicted outcome is a fall, the model matching engine 120 may be configured to search the data store(s) 110 for an animation sequence 204 that has metrics 206 reflecting similar velocity and force conditions and that are tagged with the corresponding outcome of a fall.

In some embodiments, the model matching engine 120 may be configured to use an animation matching model, such as a pose trajectory matching model, to select the animation sequence 204 from the data stores 110. For example, the animation matching model may be configured to compare the metrics 206 associated with the stored animation sequences 204 to at least some of the metrics 210-214 of the virtual character models involved in the collision event. In operation, the animation matching model may be configured to determine both the pose (the specific configuration of the virtual character models) and the trajectory (the movement or path taken by the models) (e.g., based on the movement vectors), to identify an animation sequence 204 from the data store(s) 110 having similar pose and trajectories. For example, the animation matching model may be configured to compare the movement trajectory of the virtual character models and their physical states, to corresponding metrics 206 of the animation sequences 204 stored in the data store 110. The animation matching model may be configured to select the animation sequence 204 that most closely matches the predicted pose and trajectory of the virtual character models at the moment of collision.

By matching the metrics 206 of the animation sequences 204 with the real-time metrics 210-214, the model matching engine 120 may be configured to ensure that the animation sequence 204 selected from the data store 110 corresponds to the predicted outcome of the collision event, and the specific animation sequence 204 has metrics 206 which are most closely aligned with those metrics 210-214 of the virtual character models in the virtual environment 130.

e. Animation Engine

The game application system 112 may include an animation engine 122. The animation engine 122 may be configured to animate one or more subsequent frames for rendering, according to the selected animation sequence 204 by the model matching engine 120. The animation engine 122 may be configured to apply the animation sequence 204 selected for the collision event, to the virtual character models to render one or more subsequent frames of the collision event between the virtual character models. In some embodiments, the animation engine 122 may be configured to blend the selected animation sequence 204 with the target path of the virtual character models (e.g., indicated by the movement vectors of the respective virtual character models). For example, the animation engine 122 may be configured to update the angle of approach/impact of the respective virtual character models within the animation sequence 204, to blend with or otherwise match the corresponding metrics of the virtual character models.

Once the animation engine 122 blends the animation sequence 204 with the respective target paths of the virtual character models, the animation engine 122 may be configured to apply the skeletal animation associated with the selected animation sequence 204 to the virtual character models. For example, the animation engine 122 may be configured to map the movement and poses from the animation sequence 204 (e.g., the 3D coordinates of the movement over the time series) to the skeletal framework of the virtual character models. The animation engine 122 may be configured to generate a skeletal animation indicating the physical dynamics of the collision event. The animation engine 122 may be configured to render one or more subsequent frames, according to the blended path and skeletal animation. The animation engine 122 may be configured to render the subsequent frame(s), by generating a visual output of the collision event for display at the display 128 of the player computing system 104. As illustrated in FIG. 2, following rendering of a given frame, the metrics determination engine 114 may be configured to determine updated metrics 210-214, based on any changes to the virtual environment, which may be used for determining updated predictions relating to collision events, outcomes of collision events, and/or selecting different animation sequences used for rendering further subsequent frames.

Once the collision event occurs, the animation engine 122 may be configured to use the most recently selected animation sequence 204, to render the series of frames which follow the impact. The rendered frames may capture the post-collision dynamics, thereby providing that the visual representation aligns with the predicted outcome and metrics 210-214 leading up to and through impact relating to the collision. For instance, if the collision results in a virtual character model stumbling after being hit, the animation engine 122 may be configured to render each frame depicting the gradual loss of balance and recovery or continued fall, based on the calculated physics metrics. Similarly, in the case of a successful tackle, the animation engine 122 may be configured to render the series of frames where one virtual character model drives another virtual character model to the ground, with both virtual character models exhibiting realistic reactions, such as limb movement and rolling after the collision.

B. Player Computing System

Referring back to FIG. 1, the player computing system 104 may be configured to be controlled by/interacted with a user, such as a player of a video game. The player computing system 104 may include hardware and software components for establishing communications over the network 106. For example, the player computing system 104 may be equipped with networking equipment and network software applications (for example, a web browser) that facilitates communications via one or more networks 106 (for example, the Internet or an intranet). The player computing system 104 may have varied local computing resources such as central processing units and architectures, memory, mass storage, graphics processing units, communication network availability and bandwidth, and so forth. The player computing system 104 may include any type of computing system. For example, the player computing system 104 may include any type of computing device(s), such as desktops, laptops, game application platforms, virtual reality systems, augmented reality systems, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few.

1. Game Application(s) and Application Host System

The player computing system 104 may be configured to execute one or more game applications 124. Such game applications 124 may be stored and/or executed locally and/or in a distributed environment. In a locally executed game application 124, generally, the game does not rely or utilize an external computing system (for example, the interactive computing system 102) to execute the game application. In some instances, a locally executable game may communicate with an external server (such as a server of the interactive computing system 102) to retrieve information associated with the game, such as game patches, game authentication, clouds saves, user account data, user customization information, or other features. In distributed game applications, the player computing system 104 may execute a portion of a game and the interactive computing system 102 (or an application host system 108 of the interactive computing system 102) may execute another portion of the game. For instance, the game may include a client portion executed by the player computing system 104 and a server portion executed by one or more application host systems 108. For the present discussion, the type of game application 104 may be a locally executable game, a distributed application, or an application that includes a portion that executes on the player computing system 104 and a portion that executes on at least one of the application host systems 108. It should be understood that, in instances in which the game application 104 is a locally executable game, the game application system 112 described above (and features/elements/hardware corresponding thereto, including certain information retrieved from the data store(s) 110 and/or generated by the application host system(s) 108) may be executed and/or stored locally.

2. Player Data Store

The player computing system 104 may include a data store 126. The data store 126 may be configured to store data associated with one or more game applications 124, local account data associated with an account maintained for the player by the interactive computing system 102, and/or other game-related or account-related data. For example, the data store 126 may be configured to store data associated with user preferences, custom virtual characters or teams of virtual characters playable within the virtual environment 130, customized or updated character metrics 214, and so forth. Such information may be used by the player computing system 104 and/or interactive computing system 102 for providing and/or updating the virtual environment 130.

Example Animations of Virtual Character Models

Figure 4:
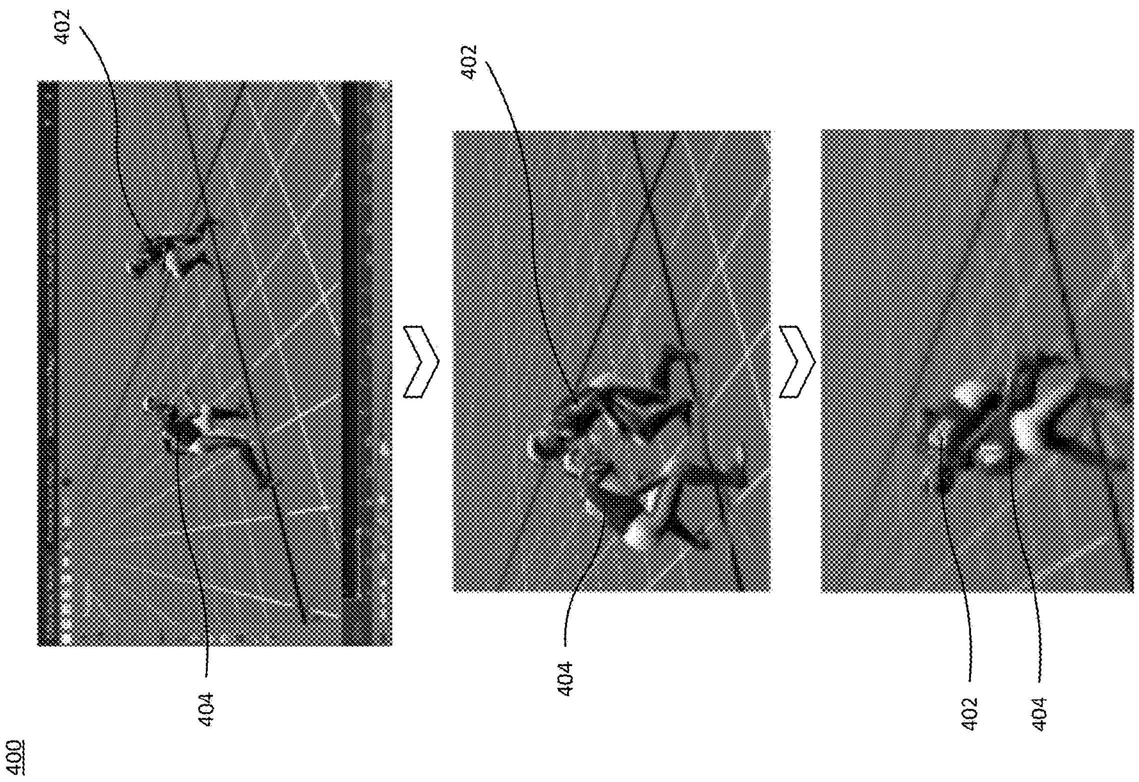
FIG. 4 is an animation scheme for frames leading up to, during, and following a collision event, according to an example implementation of the present disclosure.
Figure 5:
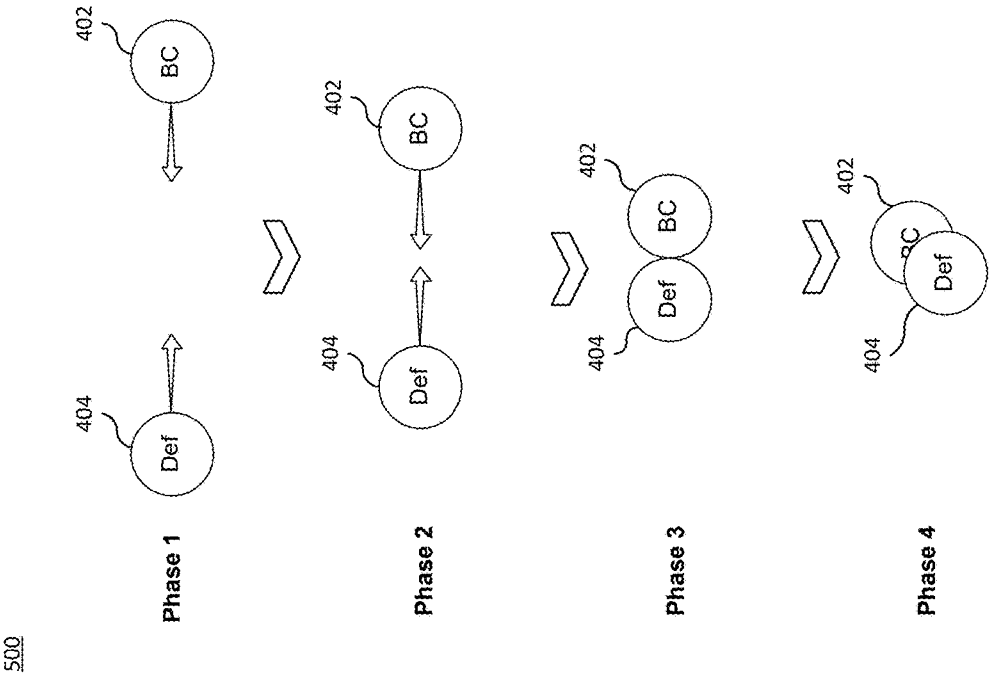
FIG. 5 is a simplified version of the animation scheme of FIG. 4, according to an example implementation of the present disclosure.

Referring to FIG. 4 and FIG. 5, depicted are respective animation schemes 400, 500 for frames leading up to, during, and following a collision event, according to an example implementation of the present disclosure. As shown best in FIG. 5, the game application system 112 may analyze a collision event according to four phases, with the first phase being a scenario matching phase, a second phase being an anticipation phase, a third phase being a contact phase, and a fourth phase being a result phase. The first virtual character model 402 (shown as BC, or ball carrier) and second virtual character model 404 (shown as Def, or defensive player) are depicted. While two virtual character models are shown, it should be understood that any number of virtual character models may be present within the virtual environment. This depiction is used for simplicity in explanation.

In the first phase, two (or more) virtual character models 402, 404 may move in a direction towards one another which is to result in a collision event. The movement of the virtual character models 402, 404 may be primarily driven by user inputs 210 (and/or user inputs 210 in combination with computer inputs to NPCs). During this phase, the virtual character models 402, 404 may be controlled by the directional and speed inputs provided by the users, with each character moving independently within the virtual environment 130. The metrics determination engine 114 may be configured to track or otherwise monitor the inputs, such as the intended direction and velocity of each virtual character model 402, 404, and the game application 124 may be configured to update the rendering according to the virtual character model 402, 404 movement. At the first stage, the game application system 112 may be configured to translate the user inputs into real-time movement, and the resulting animation sequences 204 are determined by control of the respective virtual character models 402, 404.

In the second phase, the virtual character models 402, 404 may approach one another in anticipation and leading up to the collision event. The metrics determination engine 114 continues to track the metrics 210-212 relating to virtual character model 402, 404 respective positions and velocities. As the virtual character models 402, 404 begin to approach one another, the collision detection engine 116 may analyze the metrics 210-214 for a potential collision event, with the individual movement of the virtual character models 402, 404 still primarily influenced by individual control of the respective virtual character models 402, 404. During the second phase, the collision detection engine 116 evaluates the movement vectors of the virtual character models 402, 404, to assess whether their paths are likely to intersect within a certain time frame. As user inputs 210 (and computer inputs to NPCs) are used for directional control and speed, the animation sequences may be dynamically updated to reflect any changes in direction or speed caused by such inputs. As the second phase progresses, the metrics determination engine 114 may continue to track the metrics 210-212, lead up to the point of contact between the virtual character models 402, 404. Similarly, the predicted collision events (and corresponding outcomes) are correspondingly determined/updated/modified based on the updated movement and metrics 210-212 of the virtual character models 402, 404.

In the third phase, the virtual character models 402, 404 may contact one another, resulting in the collision event. Once the virtual character models 402, 404 make contact, the predictive engine 118, model matching engine 120, and animation engine 122 may use the physics metrics 212 and character metrics 214 to process the collision event and animate/render animation sequences 204 according to the collision event. At this stage, the user inputs 210 may be factored less than the physics metrics 212 and character metrics 214, which may be used by the predictive engine 118 to determine the outcome of the collision event (e.g., based on the physical forces acting on the virtual character models 402, 404 at the moment of impact and their corresponding character metrics 214). The predictive engine 118 may analyze various physics metrics 212, such as but not limited to the linear momentum, angular momentum, torque, and the force of impact, as well as the character metrics 214, such as but not limited to strength, balance, and agility, to determine how the virtual character models 402, 404 respond to the collision. The predictive engine 118 may be configured to use these metrics to predict the result or outcome of the collision event, such as a fall, stumble, or a resisted tackle. In this regard, and during the third phase, the predictive engine 118 may prioritize the physics metrics 212 (and corresponding character metrics 214) over user inputs 210, thereby providing that the predicted outcome reflects the real-time physical dynamics of the virtual character models 402, 404. The model matching engine 120 and animation engine 122 may select animation sequences 204 based on the predicted outcome, and which have metrics which most closely align with the physics metrics 212 and character metrics 214, resulting in more accurate animation which is most realistic according to the real-time physical dynamics.

In the fourth phase, the virtual character models 402, 404 may be animated according to the outcome of the collision event. In other words, the animation engine 122 may animate the virtual character models 402, 404, according to the predicted outcome of the collision event. The model matching engine 120 may select the appropriate animation sequence 204 from the data store 110 based on the predicted outcome (e.g., made by the predictive engine 118 at the time of collision) and the real-time metrics determined by the metrics determination engine 114 leading up to and during the collision. The animation engine 122 may apply the selected animation sequence 204 to the skeletal virtual character models 402, 404, and blend the 3D coordinates of the animation sequence with the skeletal virtual character models 402, 404 along with blending of the target path and the animation sequence 204. The animation engine 122 may render the collision and post collision frames according to the selected animation sequence 204. For example, if the predicted outcome is a fall, the animation engine 122 renders the sequence showing the virtual character model 402, 404 collapsing to the ground. If the predicted outcome is a stumble, the animation engine 122 renders a sequence of the virtual character model 402, 404 regaining balance. In this phase, the animation engine 122 renders the post-impact set of frames based on the physical outcome, ensuring the animation corresponds to the physical metrics and real-time interactions calculated during the collision.

Figure 6:
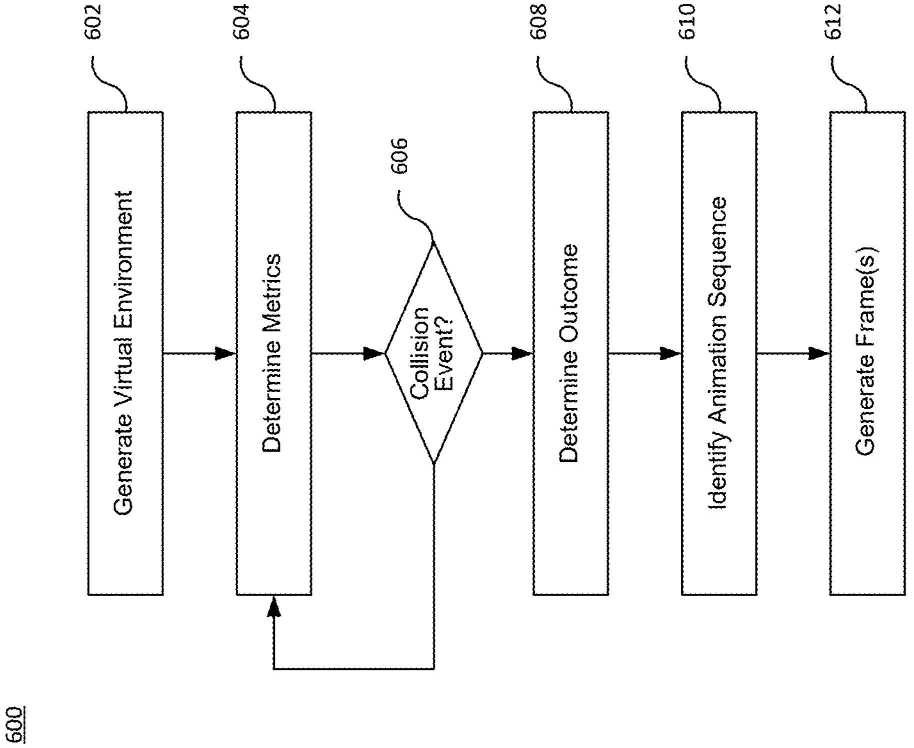
FIG. 6 is a flowchart showing an example method of constrained physically controlled animation selection and playback, according to an example implementation of the present disclosure.

Method for Constrained Physically Controlled Animation Selection and Playback Referring now to FIG. 6, depicted is a flowchart showing an example method 600 of constrained physically controlled animation selection and playback, according to an example implementation of the present disclosure. The steps of the method 600 described herein may be executed or performed by the hardware/elements described above with reference to FIG. 1-FIG. 5, such as the interactive computing system 102 and/or the player computing system 104. For example, where a video game application is a locally-executing video game application, the method 600 may be performed by the player computing system 104. Where the video game application is a hosted video game application, the method 600 may be performed by the interactive computing system 102. Where the video game application is a distributed video game application, some steps may be performed by the player computing system 104 while other steps may be performed by the interactive computing system 102.

At step 602, the game application system 112 may generate a virtual environment 130 (e.g., a virtual game environment). In some embodiments, the game application system 112 may generate the virtual game environment responsive to a user launching the game application 126, launching game play within the game application 126, etc. The virtual environment 130 may include various in-game elements such as terrain, objects, non-player characters (NPCs), and various virtual character models that interact within the virtual environment 130. The game application system 112 may generate and/or provide a first virtual character model and a second virtual character model (among other virtual character models) within the virtual environment 130. Each of the virtual character models may be initialized with their respective character metrics stored in the data store(s) 110 and accessible by the game application system 112 (e.g., via the metrics determination engine 114). The virtual character models may be controlled via user inputs 210 and/or pre-programmed/computer determined behavior according to game logic.

At step 604, the game application system 112 may determine metrics. The game application system 112 (e.g., the metrics determination engine 114) may determine a plurality of metrics associated with each virtual character model. The metrics may include, for example, physics metrics, character metrics, and/or user inputs. The physics metrics may include metrics relating to physical characteristics or quantitative values relating to movement/motion of the virtual character models in the virtual environment 130. The physics metrics may include, for example, velocity, linear momentum, angular momentum, and the direction of motion for each virtual character model, as they move within the virtual environment. For example, the game application system 112 may calculate the linear momentum of a virtual character model based on its mass and velocity, using real-time data from the user inputs 210. In addition, user inputs 210 may specify the desired speed and direction of a given virtual character model. The game application system 112 may use the user inputs 210 to determine changes in movement, and update the virtual environment 130 according to such changes in movement. The game application system 112 may determine character metrics 214 (e.g., at launch of the virtual environment 130 and/or in real-time based on specific scenarios of the virtual environment relating to particular character metrics 214). Such character metrics 214 may include, for example, strength, balance, agility, recoverability, overall player ratings, and the like. The character metrics 214 may be stored in the data store(s) 110 and retrieved by the game application system 112 as needed during gameplay.

At step 606, the game application system 112 may identify a collision event. In some embodiments, the game application system 112 may identify whether a collision event is going to (or predicted to) occur for a frame. The game application system 112 (e.g., the collision detection engine 116) may identify and/or use metrics 210-214 relating to the movement of the virtual character models, to determine whether their trajectories are likely to intersect within a time frame. The game application system 112 may compare the movement vectors of the virtual character models, to predict if and when a collision is predicted to occur. For instance, the game application system 112 may determine, e.g., based on the velocity, direction of motion, and position of two or more virtual character models within the virtual environment 130, whether the virtual character models have a trajectory indicative of a collision event.

If the predicted movement vectors indicate that the virtual character models are to intersect within a time period (e.g., within one or more frames), the game application system 112 may identify a collision event. In some embodiments, the game application system 112 may track or otherwise identify user input metrics 210 to identify clearance between the virtual character models. For example, the game application system 112 may apply or otherwise incorporate voxel analysis based on user inputs corresponding to a direction of movement for a given virtual character model, to determine the clearance between the virtual character models. The game application system 112 may use the voxel analysis to determine whether the first virtual character model has sufficient space to continue its movement without colliding with the second virtual character model, based on user input and the physics metrics calculated for each model.

Where the game application system 112 does not identify a collision event, the method 600 may loop back to step 604, where the game application system 112 continues to track metrics relating to the virtual character models (e.g., including metrics relating to their respective locomotive states). Where the game application system 112 identifies a collision event, the method 600 may proceed to step 608.

At step 608, the game application system may determine an outcome of the collision event. In some embodiments, the game application system 112 (e.g., the predictive engine 118) analyzes the physics metrics 212 and user inputs 210, for both the first and second virtual character models to determine the outcome of the collision event. The game application system 112 may apply at least some of the metrics 210-214 to a predictive model to determine the outcome of the collision event. For instance, the game application system 112 may analyze the linear momentum, angular momentum, and torque acting on each virtual character model at the moment of impact (and/or leading up to the moment of impact), to predict the outcome of the collision event. In some embodiments, the game application system 112 may apply various character metrics 214 to the predictive model, to determine the outcome of the collision event. For example, a virtual character model with higher strength may resist the impact more effectively, while a virtual character model with higher agility may recover more quickly from the collision. The game application system 112 may apply the metrics 210-214 to a predictive model, to predict the outcome (e.g., fall, stumble, successful tackle, etc.) based on such metrics 210-214.

At step 610, the game application system 112 may identify an animation sequence 204. After determining and/or predicting the outcome of the collision event, the game application system 112 (e.g., the model matching engine 120) may identify an animation sequence 204 that corresponds to the predicted outcome. The animation sequences 204 stored in the data store 110 may be tagged or labeled with a corresponding outcome 202 (e.g., a fall, stumble, or tackle). The game application system 112 may identify a subset of the animation sequences 204 in the data store(s) 110 tagged with the corresponding outcome predicted at step 608. The game application system 112 may select the animation sequence 204 from the subset, based on a comparison of metrics 206 associated with each animation sequence to the real-time metrics 210-214 of the virtual character models. In some embodiments, the game application system 112 may perform a best-fit matching process, to select the animation sequence 204 having corresponding metrics 206 which satisfy a match criterion to the metrics 210-214 of the virtual character models.

At step 612, the game application system 112 may generate frame(s). In some embodiments, the game application system 112 (e.g., the animation engine 122) generate the frame(s) by applying the selected animation sequence 204 (e.g., identified at step 610) to the virtual character models for rendering. In some embodiments, the game application system 112 may blend the animation sequence 204 with the ongoing motion of the virtual character models, such that the rendered frames are consistent with both the pre-collision movement and the post-collision outcome. For example, if the predicted outcome is a stumble, the animation engine 122 may generate frames showing the virtual character model losing balance and attempting to regain control. The animation engine 122 may generate the frame(s) by applying a skeletal animation (e.g., the 3D coordinate time-series corresponding to the animation sequence 204) to the virtual character models, adjusting limb positions, joint rotations, and body movements to match the selected animation sequence 204. In some embodiments, the animation engine 122 may generate the frame(s) for rendering at the player computing system 104. For example, the animation engine 122 may transmit information/data relating to the frame(s) to the player computing system 104, such that the display 128 may render the frame(s) generated by the animation engine 122 according to such information/data. In some embodiments, the animation engine 122 may generate the frame(s) by rendering the frames for display at the player computing system 104. For example, the animation engine 122 may render the frames into a format which can be transmitted and displayed via the display 128.

In some embodiments, the method 600 may loop between steps 606 and 612 until completion of the collision event. For example, as metrics (e.g., determined at step 604) are updated during the progression leading up to and through the collision event, the game application system 112 may reassess the occurrence and predicted outcome of the collision event, and correspondingly select new/updated animation sequences based on the real-time metrics of the virtual character models within the virtual environment.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an example embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements may be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" may be construed as inclusive so that any terms described using "or" may indicate any of a single, more than one, and all of the described terms. A reference to "at least one of 'A' and 'B'" may include only 'A', only 'B', as well as both 'A' and 'B'. Such references used in conjunction with "comprising" or other open terminology may include additional items.

Modifications of described elements and acts such as variations in sizes, dimensions, structures, shapes and proportions of the various elements, values of parameters, mounting arrangements, use of materials, colors, orientations may occur without materially departing from the teachings and advantages of the subject matter disclosed herein. For example, elements shown as integrally formed may be constructed of multiple parts or elements, the position of elements may be reversed or otherwise varied, and the nature or number of discrete elements or positions may be altered or varied. Other substitutions, modifications, changes and omissions may also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other example embodiments, and that such variations are intended to be encompassed by the present disclosure.

What is claimed is:

1. A system, comprising:

a data store comprising game application data;

an animation data store comprising a plurality of types of animation sequences relating to collision events, each type of animation sequence corresponding to a respective outcome of the collision event; and a processing circuit comprising one or more processors configured to execute a game application, based at least in part on the game application data, the game application configured to:

generate a virtual game environment comprising a first virtual character model and a second virtual character model;

identify a collision event for a first frame, between the first virtual character model and the second virtual character model, the first virtual character model and the second virtual character model being in a locomotive state within the virtual game environment;

determine one or more first metrics of the first virtual character model, and one or more second metrics of the second virtual character model, wherein at least one of the one or more first metrics and at least one of the one or more second metrics comprise (i) physics metrics relating to the locomotive state of the first virtual character model and the second virtual character model, and (ii) user inputs corresponding to user control of one of the first virtual character model or the second virtual character model;

apply the one or more first metrics and the one or more second metrics to a model, to determine an outcome of the collision event for a second frame;

identify, from the animation data store, an animation sequence having a type of animation sequence corresponding to the determined outcome, based on the identified animation sequence having one or more animation metrics which satisfy a match criterion corresponding to at least some of the one or more first metrics and the one or more second metrics; and generate the second frame, including at least a portion of a collision between the first virtual character model and the second virtual character model, according to the identified animation sequence.

2. The system of claim 1, wherein the first virtual character model is controlled by a user, wherein the second virtual character model comprises a plurality of second virtual character models, and wherein the game application is configured to:

identify the collision event for the first frame, between the first virtual character model and one or more of the plurality of second virtual character models;

determine, for the one or more of the plurality of second virtual character models, the one or more second metrics; and apply the one or more first metrics and the one or more second metrics to a model, to determine an outcome of the collision event for a second frame, between the first virtual character model and the one or more of the plurality of second virtual character models.

3. The system of claim 1, wherein the game application is further configured to:

determine, for the second frame, one or more updated first metrics for the first virtual character model and one or more updated second metrics for the second virtual character model;

apply the one or more updated first metrics and the one or more updated second metrics to the model, to determine whether the outcome of the collision event has changed for a third frame;

responsive to the outcome of the collision event for the third frame being the same as the outcome of the collision event for the second frame:

determine whether the one or more updated first metrics and the one or more updated second metrics satisfy the match criterion for the identified animation sequence; and selectively identify a different animation sequence from the animation data store, based on whether the match criterion is satisfied; and generate the third frame according to the identified animation sequence or the different animation sequence.

4. The system of claim 3, wherein the game application is configured to select the identified animation sequence responsive to the match criterion being satisfied, and wherein the third frame is rendered according to the identified animation sequence.

5. The system of claim 3, wherein the game application is configured to:

responsive to the outcome of the collision event for the third frame being a different outcome than the outcome of the collision event for the second frame:

identify, from the animation data store, a different animation sequence having a different type of animation sequence corresponding to the different outcome, based on the different animation sequence having one or more animation metrics which satisfy the match criterion corresponding to at least some of the one or more updated first metrics and the one or more updated second metrics; and generate the third frame according to the different animation sequence.

6. The system of claim 1, wherein the user inputs correspond to a direction of motion of the first virtual character model, and wherein the game application is configured to:

determine a clearance of the first virtual character model in the direction of motion, based on a voxel analysis of the first virtual character model and the second virtual character model and according to the collision event; and generate a path for the first virtual character model according to the clearance and the user input.

7. The system of claim 6, wherein the second frame is generated according to the generated path and the identified animation sequence, by blending the generated path with data corresponding to the identified animation sequence.

8. The system of claim 6, wherein the one or more first metrics comprises the direction of motion.

9. The system of claim 1, wherein the gaming application is configured to generate a plurality of frames for rendering, including the second frame, animating the collision between the first virtual character model and the second virtual character model, according to the identified animation sequence.

10. The system of claim 1, wherein the one or more first metrics comprise, for a first character corresponding to the first virtual character model, first character metrics relating to the first character, a first angular momentum, a first linear momentum, and the user inputs corresponding to a requested direction of motion of the first virtual character model, and the one or more second metrics comprise, for a second character corresponding to the second virtual character model, second character metrics relating to the second virtual character, a second angular momentum, and a second linear momentum.

11. The system of claim 1, wherein each animation sequence from the animation data store comprises respective motion capture data for the animation sequence.

12. The system of claim 1, wherein each animation sequence is tagged according to a respective type of animation sequence, and wherein the game application is configured to identify the animation sequence by selecting, using an animation matching model, from the animation sequences in the animation data store tagged according to the type of animation sequence corresponding to the determined outcome, the identified animation sequence having the one or more animation metrics which satisfy a best fit relative to the one or more first metrics and the one or more second metrics.

13. A computer-implemented method executable by a user computing device for executing a game application, the computer-implemented method comprising:

generating a virtual game environment comprising a first virtual character model and a second virtual character model;

identifying a collision event for a first frame, between the first virtual character model and the second virtual character model, the first virtual character model and the second virtual character model being in a locomotive state within the virtual game environment;

determining one or more first metrics of the first virtual character model, and one or more second metrics of the second virtual character model, wherein at least one of the one or more first metrics and at least one of the one or more second metrics comprise (i) physics metrics relating to the locomotive state of the first virtual character model and the second virtual character model, and (ii) user inputs corresponding to user control of one of the first virtual character model or the second virtual character model;

applying the one or more first metrics and the one or more second metrics to a model, to determine an outcome of the collision event for a second frame;

identifying, from an animation data store, an animation sequence having a type of animation sequence corresponding to the determined outcome, based on the identified animation sequence having one or more animation metrics which satisfy a match criterion corresponding to at least some of the one or more first metrics and the one or more second metrics; and generating the second frame, including at least a portion of a collision between the first virtual character model and the second virtual character model, according to the identified animation sequence.

14. The computer-implemented method of claim 13, further comprising:

determining, for the second frame, one or more updated first metrics for the first virtual character model and one or more updated second metrics for the second virtual character model;

applying the one or more updated first metrics and the one or more updated second metrics to the model, to determine whether the outcome of the collision event has changed for a third frame;

responsive to the outcome of the collision event for the third frame being the same as the outcome of the collision event for the second frame:

determining whether the one or more updated first metrics and the one or more updated second metrics satisfy the match criterion for the identified animation sequence; and selectively identifying a different animation sequence from the animation data store, based on whether the match criterion is satisfied; and generating the third frame according to the identified animation sequence or the different animation sequence.

15. The computer-implemented method of claim 14, wherein selectively identifying the different animation sequence comprises selecting the identified animation sequence responsive to the match criterion being satisfied, and wherein the third frame is rendered according to the identified animation sequence.

16. The computer-implemented method of claim 14, further comprising:

responsive to the outcome of the collision event for the third frame being a different outcome than the outcome of the collision event for the second frame;

identifying, from the animation data store, a different animation sequence having a different type of animation sequence corresponding to the different outcome, based on the different animation sequence having one or more animation metrics which satisfy the match criterion corresponding to at least some of the one or more updated first metrics and the one or more updated second metrics; and generating the third frame according to the different animation sequence.

17. The computer-implemented method of claim 13, wherein the user inputs correspond to a direction of motion of the first virtual character model, the method further comprising:

determining a clearance of the first virtual character model in the direction of motion, based on a voxel analysis of the first virtual character model and the second virtual character model and according to the collision event; and generating a path for the first virtual character model according to the clearance and the user input.

18. The computer-implemented method of claim 17, wherein the second frame is generated according to the generated path and the identified animation sequence, by blending the generated path with data corresponding to the identified animation sequence.

19. The computer-implemented method of claim 13, wherein each animation sequence is tagged in the animation data store, according to a respective type of animation sequence, and wherein identifying the animation sequence comprises selecting, using an animation matching model, from the animation sequences in the animation data store tagged according to the type of animation sequence corresponding to the determined outcome, the identified animation sequence having the one or more animation metrics which satisfy a best fit relative to the one or more first metrics and the one or more second metrics.

20. A non-transitory computer readable medium storing instructions that, when executed by a computing system, causes the computing system to perform a method for rendering frames within a gaming application, the method comprising:

generating a virtual game environment comprising a first virtual character model and a second virtual character model;

identifying a collision event for a first frame, between the first virtual character model and the second virtual character model, the first virtual character model and the second virtual character model being in a locomotive state within the virtual game environment;

determining one or more first metrics of the first virtual character model, and one or more second metrics of the second virtual character model, wherein at least one of the one or more first metrics and at least one of the one or more second metrics comprise (i) physics metrics relating to the locomotive state of the first virtual character model and the second virtual character model, and (ii) user inputs corresponding to user control of one of the first virtual character model or the second virtual character model;

applying the one or more first metrics and the one or more second metrics to a model, to determine an outcome of the collision event for a second frame;

identifying, from an animation data store, an animation sequence having a type of animation sequence corresponding to the determined outcome, based on the identified animation sequence having one or more animation metrics which satisfy a match criterion corresponding to at least some of the one or more first metrics and the one or more second metrics; and generating the second frame, including at least a portion of a collision between the first virtual character model and the second virtual character model, according to the identified animation sequence.

* * * * *